United States Patent Office 3,280,374
Patented Oct. 18, 1966

3,280,374
ELECTRICAL RECYCLING CIRCUIT FOR CONTROLLING AND PROTECTING FUNCTIONAL EQUIPMENT
William B. McCartney, Glen Burnie, and Edward O. Uhrig, Catonsville, Md., assignors, by mesne assignments, to the United States of America as represented by the Secretary of the Navy
Original application Dec. 17, 1962, Ser. No. 245,332. Divided and this application June 29, 1964, Ser. No. 385,535
1 Claim. (Cl. 317—33)

The present invention relates to a means for protecting power supplies from overload currents. More particularly, the present invention relates to an integrated circuit for protecting a multiplicity of power supplies from overload currents whether the power supplies are of the positive or negative polarity.

This application is a division of copending U.S. application Serial No. 245,332, filed December 17, 1962, by the present applicants.

It has been customary in the prior art to provide overload protection of power supplies so that the power supply component parts are not damaged during periods of overload current. Some of these prior art devices have incorporated a recycling circuit into the overload protection circuit to provide automatic reactivation of the power supply in cases of merely transient overload conditions. However, one serious difficulty with prior art devices is that they do not provide an integrated overload protection circuit for protecting the component parts of a multiplicity of power supplies of both the positive and negative polarity. For example, in prior art devices if one supply, for instance a positive power supply, is "switched off" because of an overload current, it is possible that the component parts of other power supplies in the same system are not protected because a negative power supply has not been switched off. This poses, among other things, the danger of "back-biasing" the component parts of the other power supplies.

Therefore, it is an object of the present invention to provide an overload protection circuit for a multiplicity of power supplies of both positive and negative polarity.

It is another object of the present invention to provide an overload protection circuit which comprises an integrated, transistorized, overload protection circuit for protecting a multiplicity of power supplies of both positive and negative polarities against overload currents.

It is a further object of the present invention to provide an overload protection circuit which is both rapid in action and positive in operation.

It is another object of the present invention to provide a power supply overload protection circuit which is adapted to provide overload protection to a multiplicity of power supplies of both positive and negative polarity simultaneously.

Other objects and their attendant advantages of the present invention may be seen as the present invention is better understood by reference to the enclosed figures and the detailed description wherein.

A better understanding of the present invention may be understood from the following detailed description wherein like numerals indicate like parts.

Figure 1:
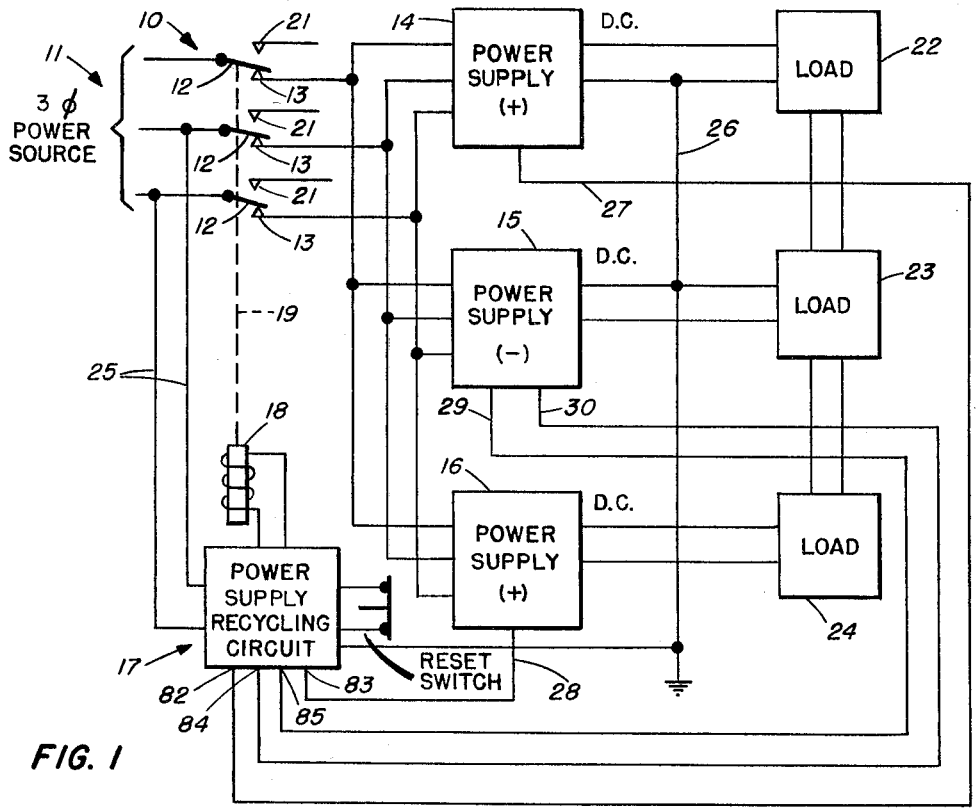
FIG. 1 is a block diagram of the present invention showing the relative position of the power source, the power supplies, the loads and the power supply recycling circuit.

Referring now to FIG. 1 there is shown a power circuit designated generally as 10. The power circuit 10 is actuated from a three-phase power source 11 which is connected into the power supplies 14, 15 and 16 by switch arms 12 and input contacts 13. The power supplies 14, 15 and 16 are shown in block form and may consist of any physical power supply known to the prior art. Power supplies 14 and 16 are shown as being positive power supplies providing positive, direct current to loads 22 and 24, respectively, and power supply 15 is shown as a negative power supply providing negative direct current to load 23. The power supply recycling circuit, shown in block form in FIG. 1 and designated generally by numeral 17, is actuated by one phase of the three-phase power supply 11 and connected into circuit 11 by leads 25. The power supply recycling circuit 17 is connected to actuate relay 18 which is connected to switching arms 12 by mechanical linkage 19. The relay 18 is adapted to move switching arms 12 from contacts 13 to back contacts 21 to disconnect three-phase power source 11 from the power supply circuits when overload current is developed.

Back contacts 21 may be connected to a suitable indicator for indicating disengagement of three-phase power source 11 from power supplies, or they may merely be used as open circuits for the three-phase power sources. Relay 18 is adapted to disengage the three-phase power source 11 from engagement with the power supplies 14, 15 and 16 when an overload current is developed.

As has been previously mentioned, power supplies 14, 15 and 16 supply direct current to loads 22, 23 and 24. Power supplies 14 and 16 are connected to supply direct current having a positive polarity, whereas power supply 15 is connected to supply direct current having a negative polarity. To achieve the aforesaid polarities of the output voltages to the loads, lead 26 grounds the negative side of power supplies 14 and 16 and the positive side of power supply 15. Power supplies 14 and 16 are connected into power supply recycling circuit 17 by leads 27 and 28, respectively. The negative power supply 15 is connected into power supply recycling circuit 17 by leads 29 and 30. Each power supply has included therein a recycling circuit coupler consisting of either the circuit shown in FIG. 4 and designated generally as 31 for the positive power supplies or the circuit shown in FIG. 5 and designated generally as 32 for the negative power supply. These couplers convert an overload current into a signal to actuate power supply recycling circuit 17. These recycling circuit couplers 31 and 32 will be hereinafter more particularly described with reference to FIGS. 4 and 5.

In the power circuit 10 as shown in FIG. 1 alternating current is supplied from three-phase power source 11 through power supply recycling circuit 17 to activate relay 18 which is normally in closed position. If a short circuit should appear in any of the loads 22, 23 or 24, its respective power supply would be switched off. When this condition occurs in a manner to be hereinafter more particularly described, a signal is transmitted to recycling circuit 17 which circuit is thereby triggered "on." When recycling circuit 17 is triggered "on" relay 18 is energized and mechanical linkage 19 moves switch arms 12 from connection with contacts 13 into connection with back contacts 21. As a result of the removal of three-phase power source 11 from electrical connection with power supplies 14, 15 and 16, the components of each of the power supplies are protected against being reversed biased by connection with a power supply of the opposite polarity and against overload currents in the power supply. After a given time delay, relay 18 is de-energized by recycling circuit 17 and alternating current from three-phase power source 11 is reapplied to the power supplies.

Figure 2:
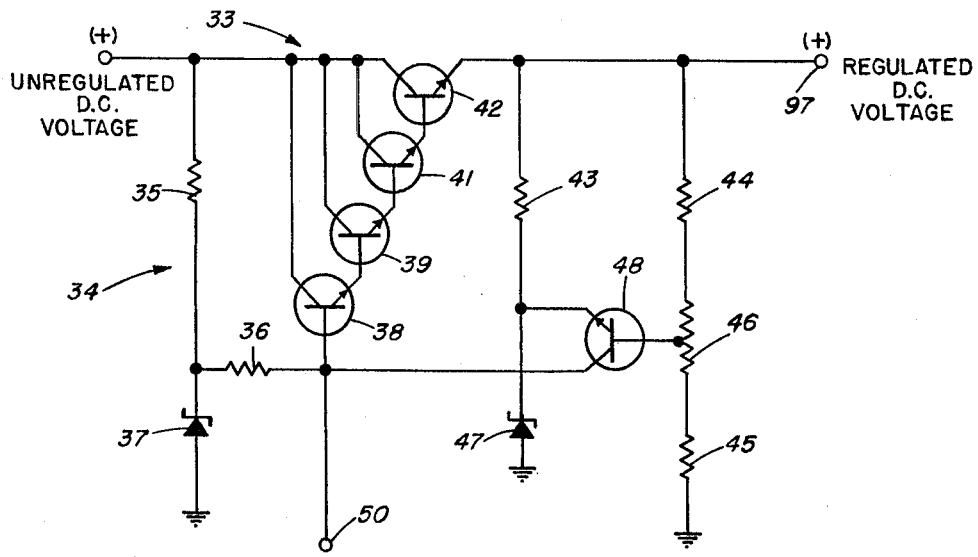
FIG. 2 is a circuit diagram of a typical voltage regulator circuit which may be used in conjunction with the power supply of the present invention.

A series of transistorized direct current regulator provided in the power supplies is shown in FIG. 2 and designated generally as 33. The purpose of series regulator 33 is to convert unregulated direct current voltage into regulated direct current voltage. The regulator circuit consists of an input circuit 34 comprising a voltage divider consisting of resistances 35, 36 and zener diode 37. This input circuit is connected across the collector-base circuit of transistor 38. Direct current regulation is achieved by a series of transistors 38, 39, 41 and 42. The ouput of the regulator is connected across the emitter of transistor 42 and the base of transistor 38. The output circuit comprises zener diode 47 and resistance combination 43, 44 and 45 along with potentiometer 46 which regulates the bias on the base of transistor 48. When transistor 48 is biased to conduction, it provides a current path from the base of transistor 38 to zener diode 47. In the event of a short circuit, or overload current in one of the loads, the base of transistor 38 is grounded through point 50 in a manner to be hereinafter more particularly described with reference to FIGS. 4 and 5, and the output of the regulator 33 decays to zero. The grounding of the base of transistor 38 is achieved through power supply couplers 31 or 32 in a manner to be hereinafter described, and this grounding provides the actuating signal into power supply recycling circuit 17 as will be more readily understood by reference to the description of FIGS. 3, 4 and 5.

Figures 3, 4:
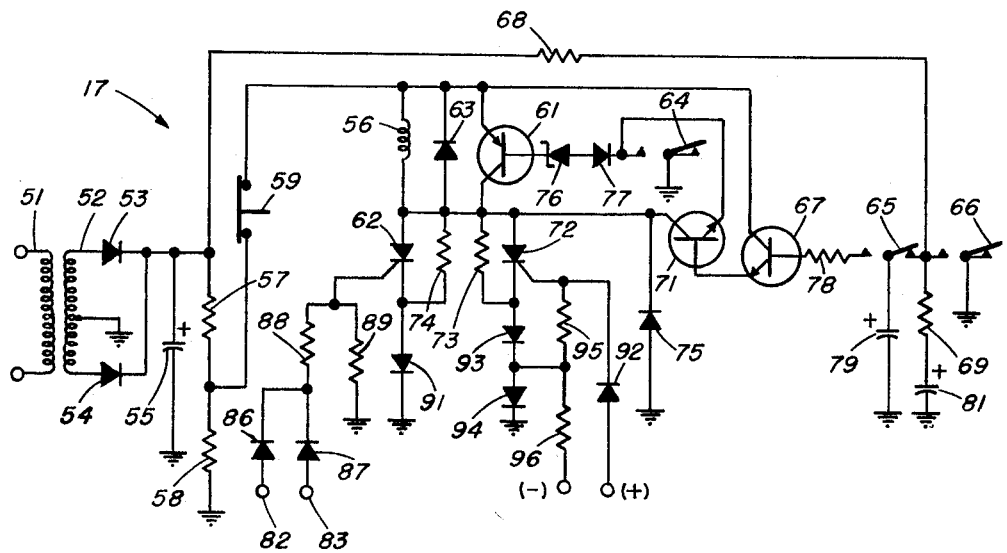
FIG. 3 is a circuit diagram of the recycling circuit of the present invention.
FIG. 4 is a circuit diagram of the coupling circuit between the power supply and the recycling circuit.

Reference should now be made to FIG. 3 wherein is shown a detailed circuit diagram of power supply recycling circuit 17. One phase of three-phase power supply 11 is connected to the input 51 of power supply recycling circuit 17 through transformer 52. This alternating current is rectified through rectifiers 53 and 54 to provide a direct current while capacitor 55 provides an alternating current ground. Relay coil 56 is supplied with voltage from input 51 through voltage divider 57, 58; this voltage being coupled through reset switch 59 to one side of relay coil 56. This voltage divider circuit is also connected to bias the emitter of transistor 61 so that the same voltage drop appears across both relay coil 56 and transistor 61 from emitter to the collector. Diode 62 which is normally biased into a non-conducting state insures that the voltage drop across relay coil 56 and transistor 61 is very small due to a substantially zero current flow through either the relay coil 56 or transistor 61. Diode 63 protects relay coil 56 from overload current and against inductive kick-back, while a normally open ground switch 64 is positioned, upon closing, to connect the emitter of transistor 71 to ground through zener diode 76 and diode 77. Relay coil 56 is designated to actuate ground switch 64, switch 65 and ground switch 66. Relay coil 56 is actuated upon appearance of a signal into recycling circuit 17 from recycling couplers 31 or 32 upon appearance of a short circuit in one of the loads in a manner to be hereinafter more particularly described. Prior to actuation of relays 56, a capacitor 79 is connected to be charged by the direct current from transformer 52 through resistor 68 and a charging circuit consisting of resistor 69 and capacitor 81 and switch 65. A transistor 67 is initially non-conducting and during normal operation of the circuit its collector is biased from voltage divider 57, 58 and its base is open-circuited through resistor 78. The emitter of transistor 67 is connected into the base of transistor 71 which transistor is also normally non-conducting due to having its emitter open circuited by switch 64. The collector of transistor 71 is connected to the cathode of diode 75, the anodes of diodes 62 and 72 and one side of each of the resistors 73 and 74. The base of transistor 61 is connected through zener diode 76 and diode 77 to one contact of ground switch 64 which contact is normally open. An output signal from each of the power supplies is connected through power supply recycling couplers 31 or 32 into the recycling circuit 17 through input terminals 82, 83, 84 and 85. Positive supplies, for instance power supplies 14 and 16 are connected into the recycling circuit through input contacts 82 and 83 whereas negative power supplies, for instance power supply 15 may be connected into input terminals 84 and 85 in a manner to be hereinafter described. The input circuits 82 and 83 for positive power supplies 14 and 16, respectively, are connected into diodes 86 and 87, respectively, to provide a voltage across a divider consisting of resistances 88 and 89. A portion of the voltage across both resistances 88 and 89 is provided to the cathode of diode 62 which cathode is grounded through diode 91. As is readily apparent, resistance 74 provides a by-pass path around diode 62. An overload current signal path for negative power supplies is provided into recycling circuit 17 through input contacts 84 and 85, contact 85 being the positive terminal and 84 being the negative terminal with the signal being fed to the cathode of diode 72 through diode 92, diode 92 being grounded through diodes 93 and 94. A voltage divider circuit consisting of resistances 95 and 96 is connected across input terminals 84 and 85 and provides separate bias for each of diodes 93 and 94. The negative power supply input circuit to power supply recycling circuit 17 is shown in an enlarged view in FIG. 6.

The recycling coupler circuit 31 for a positive power supply consists of two transistors (FIG. 4) a PNP transistor 101 and a NPN transistor 102. The base of transistor 101 is connected through bias resistor 98 to the positive side 97 of the output of the direct current regulator 33. A positive reference voltage is applied to the emitter of transistor 101 at 105, which voltage is slightly less in magnitude than the voltage from the D.C. regulator at 97. As a result of the slightly greater positive voltage on the base of transistor 101 with respect to that on the emitter of the transistor, transistor 101 is biased into a non-conducting state during normal operation of power supply 33. The collector of transistor 101 is connected to ground through resistor 103. Transistor 102 receives the bias on its base from the collector of transistor 101, and has its emitter connected to ground through resistor 104. The collector of transistor 102 is connected to the base of transistor 38 in the series power supply regulator 33 shown in FIG. 2. It may be seen by reference to FIG. 4 that when a short circuit appears in the power supply the regulator voltage at point 97 on a recycling circuit coupler 31 tends to approach zero which would supply a positive bias between emitter and base of transistor 101 and thus bias the transistor into conduction. The conduction current from collector to emitter of transistor 101 produces a voltage drop across resistor 103 which in turn biases NPN transistor 102 into conduction. Upon conduction of transistor 102 a circuit is provided from the base of transistor 38 to ground through resistor 104. The grounding of the base of transistor 38 causes the output voltage of the series regulator 33 to decay to zero volts. Simultaneously with the grounding of the base of transistor 38, the conduction of transistor 102 produces a positive voltage across resistor 104 at the emitter of transistor 102. The positive side of the voltage drop across resistor 104 is applied to terminal 82 of the recycling circuit 17. The positive voltage signal at the emitter of transistor 102 may be applied to either of input terminals 82 or 83 of the recycling circuit 17. Each of the power supplies is provided with a recycling circuit coupler 31 in the case of a positive power supply or a coupler 32 in the case of a negative power supply. Each of these couplers is designed to couple an overload current signal into recycling circuit.

Figure 5:
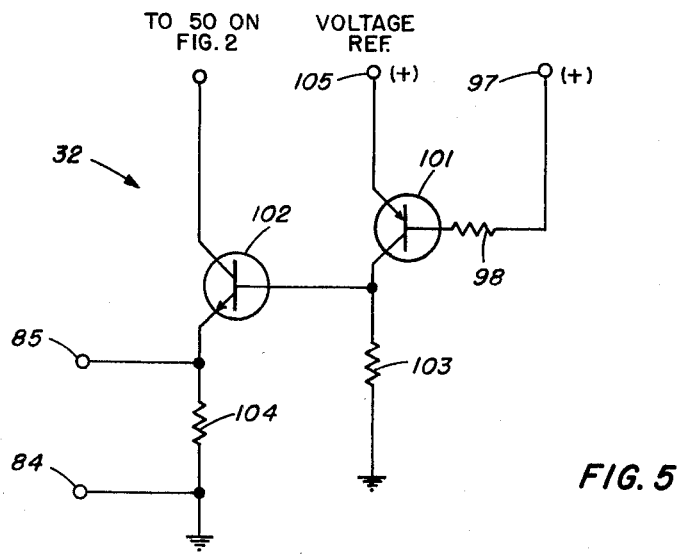
FIG. 5 is similar to FIG. 4 and is modified to show the coupling circuit between a negative power supply and the recycling circuit.

Referring now to FIG. 5 there is shown the recycling circuit coupler to be used in negative power supplies. The recycling circuit coupler 32 shown in FIG. 5 is similar to the circuit 31 shown in FIG. 4 with the exception that the bias on transistor 101 is arranged to produce conduction in the transistor upon occurrence of a short circuit in a negative power supply. This bias arrangement is achieved simply by connecting the base bias circuit into the regulated D.C. voltage supply so that there will be a positive voltage drop between the terminal 97 and ground. Again, the voltage reference at 105 is maintained at a positive polarity slightly less than the voltage at 97 and operation of the circuit is identical to that of the circuit shown in FIG. 4. The output terminals across resistor 104 are connected into the input circuit of recycling circuit 17 by terminals 84 and 85, terminal 84 being the ground terminal and terminal 85 the positive terminal.

The operation of the power supply recycling circuit is as follows; referring now to FIG. 3. Prior to the occurrence of a short circuit in one of the loads on the power circuit 10, the relay coil 56 in recycling circuit 17 is of substantially the same voltage on one side as on the other so that very little current flows therethrough. During this state of operation capacitor 79 is connected through resistance 68 to the output of transformer 52, at the input of the recycling circuit. This capacitor is thus charged to a predetermined voltage. Prior to actuation of relay 56, transistors 61, 67 and 71 are nonconducting since the bias voltages have been removed. Diodes 62 and 72 are also nonconducting since they have a very small voltage thereacross. As may be seen by reference to FIG. 4 in conjunction with FIG. 3, when a short circuit occurs in a load connected to a positive power supply, transistor 101 is biased into conduction in a manner hereinbefore described, and transistor 102 is also biased into conduction. Conduction of transistor 102 grounds the base of the respective power supply to reduce the output of the voltage regulator to zero and to provide a positive signal at the emitter of transistor 102 which signal is put into recycling circuit 17 as terminals 82 or 83. Upon appearance of a positive voltage at terminal 82 or 83 of recycling circuit 17, either of diodes 86 or 87 conduct to provide a voltage drop across the voltage divider consisting of resistances 88 and 89. Since diode 62 has its cathode connected between resistances 88 and 89, the voltage provided at this connection biases diode 62 to conduct and to provide a substantially zero resistance circuit from the collector of transistor 61 and one side of relay coil 56 to ground. Therefore, the voltage at the collector and at one side of relay coil 56 approaches zero and relay coil 56 begins to conduct. The purpose of transistor 61 is to provide a kickoff current for relay coil 56 which may be slow to start due to the back E.M.F. of the coils. Upon a conduction of relay coil 56, ground switch 64 is closed to provide a bias of the base of transistor 61 through zener diode 76 and diode 77. A potential is maintained on the base of transistor 61 prior to breakdown of zener diode 76 so that transistor 61 expedites return of relay coil 56 to its normal operating condition. Upon operation of relay 56, ground switch 64 is closed, switch 65 is connected to one side of resistor 68 and the voltage input circuit through transformer 52 and rectifiers 53 and 54 are connected to ground through switch 66 and resistor 68. When switch 65 is connected to one side of resistor 78, capacitor 79 discharges through the base of transistor 67 and from its emitter to the base of transistor 71 and from the collector of transistor 71 to the anodes of diodes 62 and 72. This current flow tends to re-establish a relatively high voltage on the collector of transistor 61 and one side of relay coil 56 so that relay coil 56 will again be deactivated and the three-phase power supply will be reconnected to the power sources to again supply direct current to the loads. If a short circuit remains in any of the loads upon reconnection, the recycling circuit will again disconnect the three-phase power source from the power supply to inactivate the circuit. Since the time period for the second deactivation of the power supply will be short, capacitor 79 will not have had time to recharge so that the recycling circuit will remain activated until it is reset manually.

As can be seen by the above description, the power supply recycling circuit provides a means for removing power supply voltage from a power supply circuit upon occurrence of a short circuit in any one of the loads and for reconnection of the power source in cases of transient short circuits. If the short circuit remains, or is not transient, the source voltage will be permanently disconnected from the power supply until the short circuit is located and removed and the power supply is reconnected manually.

Figure 6:
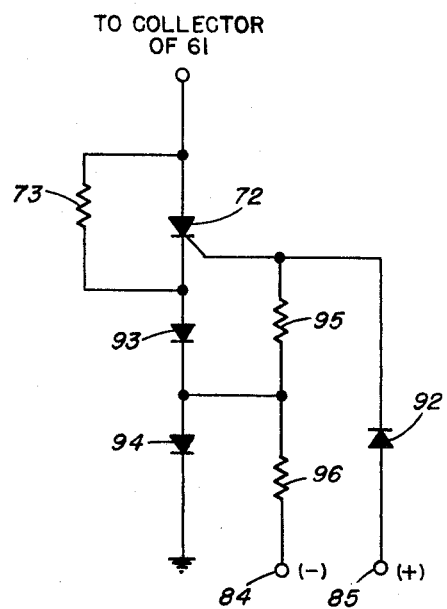
FIG. 6 is an enlarged drawing of the input circuit to the recycling circuit utilized in conjunction with the negative power supply.

The operation of the recycling circuit in conjunction with a negative power supply is similar to the operation with a positive power supply as may be seen by reference to FIG. 5 in conjunction with the recycling circuit of FIG. 3 or the enlarged view of the recycling input circuit shown in FIG. 6. Upon appearance of a short circuit in a load to which a negative power supply is connected, an output voltage is provided across resistor 104 being positive at terminal 85 and negative at terminal 84. This voltage is inserted into the input circuit of the recycling circuit 17 at terminals 84 and 85, respectively. The input signal is supplied across resistors 95 and 96 and through diode 92 to the cathode of diode 72. Diode 72 is thus biased to conduction and the recycling circuit operates to disconnect the power source from the power supply as has been hereinbefore described. Diodes 93 and 94 provide a circuit for diode 72 to ground and each diode is biased by the voltage drop across resistors 95 and 96, respectively.

As can be seen from the foregoing description, the instant invention embodies a means for protecting a multiplicity of power supplies of both the positive and negative polarity from overload currents. The above described invention provides means not only for disconnecting a single power supply upon occurrence of an overload current, but also a means for disconnecting the entire group of power supplies so that the component parts of other power supplies will not be damaged due to overload current in another power supply. The circuit provides further means for re-energizing the power supplies in order to avoid transient short circuits and for disconnecting power supplies completely upon appearance of a permanent short circuit. It should be noted that the charging circuit of the capacitor 79 could be designed to provide a multiple reactivation voltage or its discharge time constant could be adjusted so that the recycling circuit would be reactivated more than one time in cases of longer transient short circuit. This feature is merely one of designing the basic circuit and adjusting the time constant of the capacitor discharge circuit. Further, this recycling circuit could be designed to service any number of power supplies by merely changing the number of input circuits.

Obviously, many modifications and variations of the present invention are possible in the light of the above teachings. It is, therefore, to be understood that within the scope of the appended claim the invention may be practiced otherwise than as specifically described.

What is claimed is:

In a device for reducing the output of a regulated power supply to substantially zero when an overload current appears therein and for producing a signal indicative of an overload condition in a power supply, the combination comprising an input circuit power transistor means electrically coupled to said input circuit and an output circuit electrically coupled to said regulating power transistor means said input circuit including a first transistor having base, emitter and collector electrodes first bias means connecting said base of said first transistor to the output of said regulated power transistor means reference voltage means connected to said emitter of said first transistor to maintain a positive voltage slightly less than that at the output of said regulated power supply circuit thereby biasing said first transistor into conduction when an overload current appears in the regulated power supply circuit said output circuit including a second transistor having base, emitter and collector electrodes second bias means connecting said transistor to the output of said first transistor so that said second transistor is biased into conduction when said first transistor conducts said collector of said second transistor coupled directly to said power transistor means said emitter of said second transistor being coupled through a resistor to ground potential so that the voltage developed at the emitter across the resistor is indicative of an overload current in the regulated power supply.

References Cited by the Examiner

UNITED STATES PATENTS

| 2,959,717 | 11/1960 | Conger | 317—33 X |
|---|---|---|---|
| 3,086,163 | 4/1963 | Francois | 323—22 |

OTHER REFERENCES

Kear: Electronics, "Overload Protection Circuit for Voltmeters," vol. 33, No. 12, pp. 92–93, March 18, 1960.

MILTON O. HIRSHFIELD, *Primary Examiner.*

SAMUEL BERNSTEIN, *Examiner.*

J. D. TRAMMELL, *Assistant Examiner.*